United States Patent [19]

Jung

[11] Patent Number: 5,229,467
[45] Date of Patent: Jul. 20, 1993

[54] COPOLYMERS CONTAINING AMINO GROUPS, PROCESS FOR THEIR PREPARATION AND THEIR USE IN COATING AGENTS

[75] Inventor: Werner A. Jung, Ascheberg, Fed. Rep. of Germany

[73] Assignee: BASF Lacke+Farben Aktiengesellschaft[DE/DE, Munster, Fed. Rep. of Germany

[21] Appl. No.: 640,399

[22] PCT Filed: Jul. 20, 1989

[86] PCT No.: PCT/EP89/00850

§ 371 Date: Jan. 22, 1991

§ 102(e) Date: Jan. 22, 1991

[87] PCT Pub. No.: WO90/01502

PCT Pub. Date: Feb. 22, 1990

[30] Foreign Application Priority Data

Aug. 13, 1988 [DE] Fed. Rep. of Germany ..... 38275872

[51] Int. Cl.$^5$ ................................. C08F 8/32

[52] U.S. Cl. .................................. 525/379; 525/329.9; 525/330.5; 525/374; 525/381; 525/382

[58] Field of Search .................... 525/330.5, 329.9, 379

[56] References Cited

U.S. PATENT DOCUMENTS 3,669,942  6/1972  Van Westrenen ............. 260/78.5 R
4,120,839 10/1978  Emmons ....................... 260/29.2 EP
4,303,563 12/1981  Emmons ................................ 260/23

*Primary Examiner*—Joseph L. Schofer
*Assistant Examiner*—Fred Zitomer
*Attorney, Agent, or Firm*—Frank G. Werner; Anne Gerry Sabourin

[57] ABSTRACT

The invention relates to copolymers containing amino groups and having an amine number of 30 to 150 mg of KOH/g and a number-average molecular weight of 1,500 to 8,000, which can be prepared from copolymers containing alkyl ester groups by aminolysis with polyamines, processes for their preparation and their use in coating agents.

4 Claims, No Drawings

COPOLYMERS CONTAINING AMINO GROUPS, PROCESS FOR THEIR PREPARATION AND THEIR USE IN COATING AGENTS

The invention relates to copolymers which contain amino groups and are soluble in organic solvents and which can be prepared by aminolysis from copolymers—prepared by means of free radical solution polymerization—containing alkyl ester groups, processes for their preparation and their use in coating agents.

The possibility of preparing copolymers containing amino groups by aminolysis of copolymers containing alkyl(meth)acrylate is already known from U.S. Pat. No. 4,120,839. In this process described there, copolymers are initially prepared by means of free radical polymerization from styrene and at least 35 mol % of alkyl (meth)acrylate, and are converted into the copolymers containing amino groups by heating, preferably in an inert solvent, in the presence of a catalyst, with aliphatic polyamines. These copolymers containing amino groups are employed together with epoxy resins in coating agents. However, the use of vinyl ester monomers in the preparation of the copolymers containing alkyl ester groups and the resulting problems during the polymerization are not described.

There are also no vinyl ester monomers co-used in the preparation in the case of the copolymers containing amino groups which are described in DE-PS 3,043,355, EP 40,288 and U.S. Pat. No. 3,634,372.

It is also known that copolymers containing amino groups can be prepared by using monomers containing amino groups in the polymerization (compare, for example, EP 165,580, EP 167,042 and EP 181,478), or by aminolysis of copolymers containing glycidyl groups (compare, for example, DE-OS 3,412,657).

It is moreover known that problems arise in the preparation of acrylate copolymers if monomers with a greatly different reactivity compared with acrylate monomers, such as, for example, vinyl esters of aliphatic monocarboxylic acids having 5 to 15 C atoms and branched in the α-position, are employed. In these cases, it is difficult to obtain uniform, that is to say randomly homogeneously distributed, copolymers.

One possibility of solving this problem is the process described in U.S. Pat. No. 4,039,734 for copolymerization of monomers of different reactivity, in which at least some of the reactive monomer is added continuously to the reaction mixture in an amount such that the relative monomer ratio remains constant. The amount of monomer required for this in each case is determined with the aid of the heat of reaction liberated.

In the process described in DE-PS 2,032,647, uniform vinyl ester, vinylaromatic and hydroxyacrylate copolymers are obtained by stepwise addition of the individual monomers. In this process, the total amount of vinyl esters is initially introduced together with 5 to 15% by weight of the total amount of the vinylaromatics and the total amount of the other monomers with functional hydroxyl groups and unsaturated carboxylic acids. The residual amount of monomer is then either added gradually in its entirety or is metered in so that the feed of OH and COOH monomers takes longer in time than the vinylaromatic feed. Disadvantages of this process are the very high residual monomer content (that is to say the amount of unreacted starting monomer, expressed in % by weight, based on the total amount of this monomer originally employed) of up to 40% by weight of vinyl esters if a high vinylaromatic content of up to 50% by weight is used, and the associated toxicity problems. The high solvent content of the coating agents caused by the high viscosity of the binder solutions is furthermore unfavorable in view of the pollution of the environment by solvent when the lacquer films are dried. There is also the risk of clouding phenomena in polymer solutions with a relatively high solids content, and these can only be eliminated by addition of further solvent.

The English-language technical information "VeoVa polymers LR-40 and LR-2041 for water-thinnable paints" from Shell also describes such copolymers containing vinyl esters, vinylaromatic and hydroxyalkyl esters, but these likewise have precisely the disadvantages mentioned above.

Finally, some bulk polymerization processes for the preparation of copolymers containing vinyl esters are also known, in which the total amount of vinyl ester, if appropriate with some of the total amount of the other monomers and if appropriate initiator, is likewise heated and the remaining amount of monomers and initiator is then added gradually (compare, for example, DE-PS 2,422,043 and DE-OS 2,615,101). Although it is possible to incorporate vinyl ester completely in this process (residual monomer content <10% by weight), the copolymer solutions thus obtained after dissolving the polymer mass are cloudy and unsuitable for lacquer formulations.

The invention was thus based on the object of providing copolymers containing amino groups which can be prepared by means of a simple process, which have a low residual monomer content (<10% by weight) of vinyl ester monomers, even when a high vinylaromatic content of up to 50% by weight, based on the total amount of monomer is used in the preparation of the intermediate stage of copolymers containing alkyl ester groups, and which give clear solutions. In particular, the resulting solutions of the copolymers containing amino groups should have the lowest possible viscosity. The coating agents prepared using these copolymers should correspondingly have the maximum possible solids content at a viscosity, which is favorable for processing, of 16 to 20 seconds, measured in a flow cup according to DIN 4, exhibit good pigmentability and lead to coatings with good technological properties, in particular good hardness and stability to petrol.

Surprisingly, this object is achieved by a copolymer (B) which contains amino groups and can be prepared by aminolysis of copolymers (A)—prepared by means of free radical solution polymerization—containing alkyl ester groups, wherein the copolymer (B) containing amino groups can be prepared by a procedure in which (A) a copolymer (A) containing alkyl ester groups has been synthesized from a1) 5 to 25% by weight, preferably 10 to 20% by weight, of one or more vinyl esters of monocarboxylic acids, preferably vinyl esters of monocarboxylic acids having 5 to 15 C atoms per molecule and branched in the α-position, a2) 10 to 50% by weight, preferably 20 to 45% by weight, of one or more vinylaromatic hydrocarbons, a3) 10 to 40% by weight, preferably 15 to 35% by weight, of one or more alkyl esters of aliphatic, olefinically unsaturated carboxylic acids having 1 to 6 C atoms, preferably 1 to 4 C atoms, in the alkyl radical and a4) 0 to 40% by weight of other ethylenically unsaturated copolymerizable monomers, the sum of components a1 to a4 in each case being 100% by weight, by free radical solution polymerization at temperatures of 130° to 200° C., preferably 150° to 180° C., by I) initially introducing at least 60% by weight, preferably 100% by weight, of the total amount of component a1, II) metering in components a2 to a4 and any remainder of component a1 within a monomer addition period which is of equal length for all the components such that 1) the amount of component a1 added per unit time remains constant or decreases within the monomer addition period, 2) the amount of components a3 and a4 added per unit time remains constant within the monomer addition period and 3) the amount of component a2 added within the first third of the monomer addition period is 15 to 30% by weight, preferably 18 to 26% by weight, of the total amount of component a2, and within the second third is 25 to 40% by weight, preferably 30 to 38% by weight, and within the last third is 35 to 60% by weight, preferably 40 to 50% by weight, of the total amount of component a2, and (B) the copolymer (A) has been reacted with polyamines to give a copolymer (B) containing amino groups with an amine number of 30 to 150 mg of KOH/g and an average molecular weight (number-average) of the copolymer (B) of 1,500 to 8,000.

Vinyl esters of monocarboxylic acids, preferably vinyl esters of monocarboxylic acids having 5 to 15 C atoms per molecule and branched in the α-position, are employed as component a1. The branched monocarboxylic acids can be obtained by reaction of formic acid or carbon monoxide and water with olefins in the presence of a liquid, strongly acid catalyst; the olefins can be cracking products of paraffinic hydrocarbons, such as petroleum fractions, and can contain both branched and straight-chain acyclic and/or cycloaliphatic olefins Reaction of such olefins with formic acid or with carbon monoxide and water gives a mixture of carboxylic acids in which the carboxyl group is predominantly on a quaternary carbon atom. Examples of other olefinic starting substances are propylene trimer, propylene tetramer and diisobutylene. The vinyl esters can also be prepared from the acids in a manner which is known per se, for example by reacting the acids with acetylene.

Vinyl esters of saturated aliphatic monocarboxylic acids having 9 to 11 C atoms and branched on the α-C atom are particularly preferred—because of their good availability. The vinyl ester of p-tert.-butylbenzoic acid is also particularly preferred. Examples of other suitable vinyl esters are vinyl acetate and vinyl propionate.

The amount of component a1 is 5 to 25% by weight, preferably 10 to 20% by weight.

Component a2 is a monovinylaromatic compound. It preferably contains 8 or 9 carbon atoms per molecule. Examples of suitable compounds are styrene, vinyltoluenes, α-methylstyrene, chlorostyrenes, o-, m- or p-methylstyrene, 2,5-dimethylstyrene, p-methoxystyrene, p-tert.-butylstyrene, p-dimethylaminostyrene, p-acetamidostyrene and m-vinylphenol. Vinyltoluenes and, in particular, styrene are preferably employed. The amount of component a2 is 10 to 50% by weight, preferably 20 to 45% by weight.

Alkyl esters of aliphatic, olefinically unsaturated carboxylic acids having 1 to 6 C atoms, preferably 1 to 4 C atoms, in the alkyl radical are employed as component a3.

Examples of these are methyl (meth)acrylate, ethyl (meth)acrylate, propyl (meth)acrylate, butyl (meth)acrylate, isopropyl (meth)acrylate, isobutyl (meth)acrylate, pentyl (meth)acrylate, isoamyl (meth)acrylate, hexyl (meth)acrylate, cyclohexyl (meth)acrylate and the corresponding esters of maleic, fumaric, crotonic, isocrotonic, vinylacetic and itaconic acid.

Component a3 is employed in an amount of 10 to 40% by weight, preferably 15 to 35% by weight.

0 to 40% by weight of other ethylenically unsaturated copolymerizable monomers (component a4) can also be employed for building up the copolymer (A) containing hydroxyl groups. The choice of these monomers is not particularly critical. However, it should be ensured that the incorporation of these monomers does not lead to undesirable properties of the copolymer. Thus, the choice of component a4 largely depends on the properties desired for the hardenable composition in respect of elasticity, hardness, compatibility and polarity.

Amides of acrylic and methacrylic acid and their derivatives, such as, for example, acrylamide, methacrylamide and N-alkylamides, such as, for example, N-methyl(meth)acrylamide, N-ethyl(meth)acrylamide, N-propyl(meth)acrylamide, N-isopropyl(meth)acrylamide, N-butyl(meth)acrylamide, N-isobutyl(meth)acrylamide, N-pentyl(meth)acrylamide, N-hexyl(meth)acrylamide, N-cyclohexyl(meth)acrylamide, N-octyl(meth)acrylamide, N-dodecyl(meth)acrylamide and N-decyl(meth)acrylamide, are preferably employed as component a4. Long-chain alkyl-substituted acrylamide and methacrylamide derivatives are preferred here, and dodecylmethacrylamide is especially preferred.

Compounds which are resistant to aminolysis, such as, for example, N-vinylpyrrolidone, are furthermore preferably employed as component a4.

Unsaturated nitriles, such as, for example, (meth)acrylonitriles, and compounds such as, for example, (meth)acrylic acid, vinyl chloride, vinylidene chloride, vinyl fluoride and vinylidene fluoride, are furthermore suitable as component a4.

The polymerization of the monomer components a1 to a4 is preferably carried out with exclusion of oxygen, for example by working in a nitrogen atmosphere. The reactor is equipped with appropriate stirring, heating and cooling equipment and with a reflux condenser, in which volatile constituents, such as, for example, styrene, are retained. The polymerization reaction is carried out at temperatures of 130° to 200° C., preferably 150° to 180° C., using polymerization initiators and if appropriate polymerization regulators.

Suitable free radical initiators are organic peroxides, such as, for example, dibenzoyl peroxide, dicumyl peroxide, cumene hydroperoxide, di-tert.-butyl peroxide, tert.-butyl hydroperoxide, 2,2-di-tert.-butylperoxybutane, tert.-amyl perbenzoate, 1,3-bis(tert.-butylperoxyisopropyl)-benzene, diisopropylbenzene monohydroperoxide and diacyl peroxides, such as, for example, diacetyl peroxide, peroxyketals, such as, for example, 2,2-di-(tert.-amylperoxy)-propane and ethyl 3,3-di(tert.-amylperoxy)-butyrate, and highly substituted ethane derivatives which are unstable to heat, for example based on silyl-substituted ethane derivatives and based on benzopinacol. Aliphatic azo compounds, such as, for example, azobiscyclohexanenitrile, can furthermore also be employed. Depending on the monomers employed, however, when azo compounds are used there is the risk of yellowing of the polymers which—depending on the intended use of the polymers—may be troublesome, so that in these cases other initiators must be employed.

The amount of initiator is in most cases 0.1 to 5% by weight, based on the amount of monomer to be processed, but if appropriate it can also be higher. The initiator, dissolved in some of the solvent employed for the polymerization, is gradually metered in during the polymerization reaction. The initiator feed preferably lasts about 1 to 2 hours longer than the monomer feed, in order thus also to achieve a good action during the after-polymerization phase. If initiators with only a low rate of dissociation are employed under the present reaction conditions, it is also possible for the initiator to be initially introduced.

The reaction is preferably carried out in the presence of polymerization regulators, since a narrower molecular weight distribution is in this way achieved and clouding of the polymer solutions is easier to avoid. Mercapto compounds are preferably suitable as regulators, and mercaptoethanol is particularly preferably employed. Other possible regulators are, for example, alkylmercaptans, such as, for example, t-dodecylmercaptan, octylmercaptan, phenylmercaptan, octyldecylmercaptan and butylmercaptan, and thiocarboxylic acids, such as, for example, thioacetic acid or thiolactic acid.

These regulators are employed in an amount of up to 2% by weight, based on the amount of monomer to be processed. They are preferably dissolved in one of the monomer feeds and added with the monomers. The amount of regulator added is preferably constant with respect to time.

The polymerization is carried out in a high-boiling organic solvent which is inert towards the monomers employed. Examples of suitable solvents are high-boiling alcohols, such as, for example, n-hexanol, 2-ethylhexanol, isooctyl alcohol, isononyl alcohol, isodecyl alcohol, isotridecyl alcohol, cyclohexanol, methylcyclohexanol, benzyl alcohol, methylbenzyl alcohol, tetrahydrofurfuryl alcohol, diacetone alcohol, 2,6-dimethyl-4-heptanol, 4-methyl-2-pentanol and tridecanol; glycols and glycol derivatives, such as, for example, ethylene glycol, 1,2-propylene glycol, 1,3-butylene glycol, butane-1,4-diol, hexylene glycol, 2-ethylhexane-1,3-diol, diethylene glycol, triethylene glycol, dipropylene glycol, methyldiglycol, ethyldiglycol, butyldiglycol, hexyldiglycol, tripropylene glycol methyl ether, methoxytriglycol, ethylglycol acetate, butylglycol acetate, ethyldiglycol acetate and ethylene glycol diacetate; relatively highly substituted aromatics, such as, for example Solvent Naphtha ®, heavy benzene, various Solvesso ® grades, various Shellsol ® grades and Deasol ®, and higher-boiling aliphatic and cycloaliphatic hydrocarbons, such as, for example, various white spirits, mineral turpentine oil, tetralin and decalin.

It is essential to the invention for the copolymerization of components a1 to a4 to be carried out as follows:

At least 60% by weight, preferably 100% by weight, of the total amount of component a1 to be employed is initially introduced into the reactor, together with some of the total amount of solvent to be employed, and the components are heated up to the particular reaction temperature. The remaining amount of the solvent is—as already described—preferably added gradually together with the catalyst. Any remaining amount of component a1 which may still exist and the other monomers (components a2, a3 and a4) are metered into the initially introduced component a1 within a monomer addition period which is of equal length for all the components (and is in general 2-10 hours, as is customary for acrylate copolymerizations) as follows:

1) The amount of any of component a1 still existing (that is to say the residual amount of component a1 which was not initially introduced) added per unit time remains constant or decreases within the monomer addition period, the last process variant being preferred In the case of a constant amount being added, component a1 is preferably metered in together with components a3 and a4.

2) The amount of components a3 and a4 added per unit time remains constant within the monomer addition period.

3) The amount of component a2 added per unit time is varied within the monomer addition period such that the total amount of component a2 added within the first third of the monomer addition period is 15 to 30% by weight, preferably 18 to 26% by weight, of the total amount of component a2. Within the second third of the monomer addition period, a total of 25 to 40% by weight, preferably 30 to 38% by weight, and within the last third of the monomer addition period, 35 to 60% by weight, preferably 40 to 50% by weight, of the total amount of component a2 is metered in, the sum of the amounts added in the 1st, 2nd and 3rd third of course being 100% by weight.

There are various possibilities of variation in the amount of component a2 added per unit time, it being decisive only that the abovementioned total amounts added in the particular third are observed. Thus, for example, there is the possibility of changing the amount of component a2 added per unit time stepwise. Any desired number of steps in which the amount added is in each case changed can be chosen. Thus, for example, the amount of component a2 added per unit time can be increased only at the start of the second and/or at the start of the third third. The amount added per unit time then in each case remains constant within the third. However, it is also possible for the amount of component a2 added per unit time to be changed continuously, in accordance with the limit case of an infinite number of steps.

The addition of the components in the manner described promotes, as is assumed, the copolymerization and reduces homopolymerization of the individual components. In addition, copolymers which have a very low residual monomer content and give clear solutions with a high solids content are obtained.

In a second step, the copolymers (A) are converted into the copolymers (B) containing amino groups by reaction with a polyamine. Polyamines having at least one primary amino group are preferably employed for the aminolysis. Diprimary diamines, such as, for example, ethylenediamine, tri-, tetra-, penta-, hexa-, hepta- and nonamethylenediamine, 2,2,4- and 2,4,4-trimethylhexamethylenediamine, propylenediamine, 1,3- and 1,4-butylenediamine, methanediamine, isophoronediamine and 3,3,-dimethyl-4,4,-diaminodicyclohexylmethane, are particularly preferred. Aromatic diprimary diamines, such as, for example, benzidine, diaminodiphenylmethane, phenylenediamines, toluylenediamines, xylylenediamines and diamines having 3 benzene nuclei in the molecule, such as bis(4-aminophenyl)-α,α'-p-xylene, are furthermore possible.

Polyamines having at least one primary and at least one other amino group, such as, for example, diethylenetriamine, triethylenetetramine, tetraethylenepentamine, dipropylenetriamine, tripropylenetetramine, tetrapropylenepentamine, tris-(2-aminoethyl)-amine and N-(2-aminoethyl)-ethanol are moreover also suitable for the aminolysis.

The reaction of the polyamine with the polymer (A) containing alkyl ester groups is carried out at temperatures between 50° and 200° C. If the polymer (A) contains methacrylate ester groups to be aminolyzed, the reaction is preferably carried out at temperatures between 120° and 160° C., and in the case of acrylate ester groups the reaction is carried out at temperatures between 100° and 125° C.

The reaction is preferably carried out in the presence of 0.01 to 1.0% by weight, based on the weight of the polyamine, of a catalyst. Suitable catalysts are metal alkoxides, for example sodium methoxide and potassium t-butoxide; metal hydroxides, for example sodium hydroxide and potassium hydroxide; ammonium salts, for example ammonium chloride, or bifunctional catalysts, such as, for example, 2-hydroxypyridine.

The amount of polyamine employed is chosen so that the copolymer (B) formed has an amine number of 30 to 150 mg of KOH/g, preferably 50 to 120 mg of KOH/g. The average molecular weight (number-average) of the copolymer (B) is between 1,500 and 8,000.

The invention also relates to a process for the preparation of copolymers containing amino groups by aminolysis of copolymers (A)—prepared by means of free radical solution polymerization—containing alkyl ester groups, which comprises (A) reacting
a1) 5 to 25% by weight, preferably 10 to 20% by weight, of one or more vinyl esters of monocarboxylic acids, preferably vinyl esters of monocarboxylic acids having 5 to 15 C atoms per molecule and branched in the α-position,
a2) 10 to 50% by weight, preferably 20 to 45% by weight, of one or more vinylaromatic hydrocarbons,
a3) 10 to 40% by weight, preferably 15 to 35% by weight, of one or more alkyl esters of aliphatic, olefinically unsaturated carboxylic acids having 1 to 6 C atoms, preferably 1 to 4 C atoms, in the alkyl radical and
a4) 0 to 40% by weight of other ethylenically unsaturated copolymerizable monomers, the sum of components a1 to a4 in each case being 100% by weight,
at temperatures of 130° to 200° C., preferably 150° to 180° C., to give a copolymer (A),
I) initially introducing at least 60% by weight, preferably 100% by weight, of the total amount of component a1,
II) metering in components a2 to a4 and any remainder of component a1 within a monomer addition period which is of equal length for all the components such that
  1) the amount of component a1 added per unit time remains constant or decreases within the monomer addition period,
  2) the amount of components a3 and a4 added per unit time remains constant within the monomer addition period and
  3) the amount of component a2 added within the first third of the monomer addition period is 15 to 30% by weight, preferably 18 to 26% by weight, of the total amount of component a2, and within the second third is 25 to 40% by weight, preferably 30 to 38% by weight, and within the last third is 35 to 60% by weight, preferably 40 to 50% by weight, of the total amount of component a2, and
(B) reacting the copolymer (A) with polyamines to give a copolymer (B) containing amino groups and having an amine number of 30 to 150 mg of KOH/g and an average molecular weight (number-average) of the copolymer (B) of 1,500 to 8,000.

The components a1 to a4 which can be employed in this process and the procedure for carrying out the process according to the invention have already been described in detail in connection with copolymers (B) according to the invention, so that reference is made only to this description here.

The present invention furthermore relates to coating agents containing the copolymers (B) according to the invention as binder components. Suitable hardener components in these coating agents are aminoplast resins, epoxides, compounds or resins which carry double bonds which are capable of Michael addition, polyisocyanates and compounds which contain carboxylic acid and/or carboxylic acid ester and/or carboxylic acid anhydride groups capable of amide and/or imide formation.

The hardeners are in each case added in an amount such that the molar ratio of the amino groups of copolymer (B) to the reactive groups of the crosslinking agent is between 0.3:1 and 3:1.

Aminoplast resins which are suitable as hardener components are preferably melamine and/or benzoguanamine resins. These are etherified melamine- or benzoguanamineformaldehyde condensation products. The compatibility of the resins with other film-forming agents and solvents is influenced by the chain length of the etherifying alcohol and the degree of etherification. The main etherification components are n- and isobutanol and methanol. Hexamethoxymethylmelamine resins are of very great importance. However, they have the disadvantage that such combinations harden only at temperatures above 150° C., and addition of acid catalysts is often necessary. The resins prepared with little formaldehyde and/or etherified with secondary or tertiary alcohols, on the other hand, in some cases already crosslink at below 100° C. However, the corresponding urea and urethane resins can also be employed.

Crosslinking agents which are furthermore suitable are also aliphatic polyepoxide compounds of epoxidized oils, for example epoxidized linseed oil or epoxidized soya oil, epoxidized cyclic compounds, such as vinylcyclohexene diepoxide, glycidyl ethers of hydrogenated bisphenol A, 3,4-epoxycyclohexylmethyl 3,4-epoxycyclohexanecarboxylate, epoxy resins based on epichlorohydrin and polyhydric alcohols, such as pentaerythritol, trimethylolpropane or sorbitol, aromatic epoxy resins, such as polyglycidyl ethers of polyhydric phenols, for example glycidyl ethers of 4,4'-diphenylolmethane or -propane or polyglycidyl ethers of novolaks, glycidyl esters of aliphatic or aromatic polycarboxylic acids, for example diglydidyl(sic) terephthalate, or glycidyl methacrylate copolymers. Epoxy resins based on dinuclear melamine resins, reacted with acrylamide and with subsequent epoxidation of the acrylic double bond, are particularly suitable for use in automobile repair lacquering.

Examples of possible compounds or resins which carry double bonds capable of Michael addition are acrylic and/or methacrylic acid esters of polyhydric alcohols, such as trimethylolethane triacrylate or trimethylolpropane triacrylate and/or the corresponding methacrylic acid esters, butanediol diacrylate and/or unsaturated polyesters based on fumaric and/or maleic acid. These polyesters can additionally contain in the carboxylic acid component up to 70%, preferably up to 30%, of saturated at least dibasic carboxylic acid units which contain no double bonds capable of Michael addition, such as ortho-, iso- or terephthalic acid, tetrahydrophthalic acid, hexahydrophthalic acid or adipic acid. Instead of acids, it is of course also possible to use the corresponding anhydrides in the preparation of the polyesters. Possible alcohols for the preparation of the unsaturated polyesters are, preferably, diols, such as ethylene glycol, 1,2- and 1,3-propanediol, diethylene glycol and/or dipropylene glycol. Combinations of polymer resins according to the invention with acrylic esters which are at least trifunctional, such as glycerol, trimethylolethane or -propane triacrylate and pentaerythritol tetraacrylate, are particularly reactive. Such combinations also harden very rapidly at below room temperature.

Hardener components which are furthermore suitable are polyisocyanates having at least 2 isocyanate groups per molecule. Examples of suitable di- or polyisocyanates are: aromatic isocyanates, such as, for example, toluylene 2,4- and 2,6-diisocyanate and mixtures thereof, diphenylmethane 4,4'-diisocyanate, m-phenylene, p-phenylene, diphenyl 4,4'-, naphthalene 1,5-, naphthalene 1,4-, toluidine 4,4'- and xylylene diisocyanate, and substituted aromatic systems, such as, for example, dianisidine diisocyanates, diphenyl ether 4,4'-diisocyanates or chlorodiphenylene diisocyanates, and aromatic isocyanates of higher functionality, such as, for example, 1,3,5-triisocyanatobenzene, 4,4'-,4''-triisocyanatotriphenylmethane(sic), 2,4,6-triisocyanatotoluene and 4,4'-diphenyldimethylmethane 2,2', 5,5'-tetraisocyanate; cycloaliphatic isocyanates, such as, for example, cyclopentane 1,3-, cyclohexane 1,4-, cyclohexane 1,2- and isophorone diisocyanate; and aliphatic isocyanates, such as, for example, trimethylene, tetramethylene, pentamethylene, hexamethylene and trimethylhexamethylene 1,6-diisocyanate and trishexamethylene triisocyanate.

Polyisocyanate prepolymers are furthermore also suitable. There may be mentioned here adducts of toluylene diisocyanate and trimethylolpropane, a biuret formed from 3 molecules of hexamethylene diisocyanate and the trimers of hexamethylene diisocyanate and of 3,5,5-trimethyl-1-isocyanato-3-isocyanatomethylcyclohexane. Combinations with polyisocyanates or resins which carry isocyanate groups crosslink very rapidly even at temperatures below 0° C.

However, it is also possible to use the isocyanates described above which have been reacted with customary masking agents, such as, for example, phenols, alcohols, acetoacetic acid esters, ketoxime- (sic) and ε-caprolactam. These combinations are stable at room temperature and in general harden only at temperatures above 100° C. In particular cases, for example if acetoacetic acid esters are used for the masking, crosslinking can also already occur below 100° C.

Suitable hardeners are also compounds or resins which contain carboxylic acid and/or carboxylic acid ester and/or carboxylic acid anhydride group and which react with the polymers according to the invention via amide or imide formation. The hardening temperature depends on the reactivity of the carboxylic acid, carboxylic acid ester or carboxylic acid anhydride groups contained in the combination partner. Thus, for example, it is possible to provide with polyfunctional compounds or resins which carry reactive ester bonds of malonic acid or of acetoacetic acid, coating agents which already crosslink at 80°-120° C., whereas if saturated alkyd resins are used, hardening temperatures above 120° C., preferably even above 150° C., are required.

The coating agents according to the invention can furthermore also contain the customary pigments and fillers in the customary amounts, preferably 0 to 60% by weight, based on the total composition, as well as other customary auxiliaries and additives, such as, for example, flow control agents, silicone oils, plasticizers, such as phosphoric acid esters and phthalic acid esters, additives which control the viscosity, delustering agents, UV absorbers and light stabilizers, in the customary amounts, preferably 0.2 to 10% by weight, based on the total composition.

These coating agents can be applied in the form of a film to a substrate by spraying, flooding, dipping, rolling, knife-coating or brushing, the film subsequently being hardened to give a firmly adhering coating.

The coating agents according to the invention are suitable—if low hardening temperatures of between 20 and 80° C. can be used by appropriate choice of the hardener components (see above)—for repair lacquering of motor vehicles, and in particular for use as a primer and filler material.

The invention is explained in more detail in the following examples. All the data on parts and percentages are weight data, unless expressly stated otherwise.

EXAMPLE 1

419.75 parts of Shellsol A ® (mixture of C3-C4-alkyl-substituted aromatics) and 400.00 parts of a commercially available mixture of vinyl esters of saturated aliphatic monocarboxylic acids having predominantly 10 C atoms and branched on the α-C atom, are initially introduced into a reaction kettle provided with a stirrer, reflux condenser, thermometer and feed equipment.

The following components are weighed into the monomer tank I and mixed:
500.00 parts of methyl methacrylate,
300.00 parts of hydroxydimethylpropylmethacrylamide,
200.00 parts of vinylpyrrolidone and
20.00 parts of mercaptoethanol.
600 parts of styrene are weighed into the monomer tank II.

The following components are weighed into the initiator feed and mixed:
26 parts of dicumyl peroxide and
78 parts of Shellsol A ®.

The initial mixture is heated up to 160°-170° C. The contents of monomer tank I and of the initiator tank are metered into the kettle uniformly within 4.5 hours. The contents of monomer tank II is metered in over a period of 4.5 hours such that 1/6 of the amount of styrene is metered in over the first 90 minutes, 2/6 of the amount of styrene is metered in from the 91st to the 180th minute and half the total amount of styrene is metered in over the remaining feed time.

Thereafter, a mixture of 15.0 parts of Shellsol A ® and 5.0 parts of dicumyl peroxide are again added from the initiator tank in the course of 1 hour, and after this addition the mixture is after-polymerized for a further hour.

507.3 parts of Shellsol A ® are now distilled off and the solid is dissolved with 507.3 parts of xylene. The copolymer solution A thus obtained has a solids content of 81.4% (1 hour, 130° C.) and a viscosity (50% strength in butyl acetate) of 1.1 dPas (23° C.). The residual content of free vinyl ester monomer in the solution was determined as 0.5% by weight by means of gas chromatography. This corresponds to a residual monomer content of 3.77% by weight, based on the total amount of vinyl ester monomer employed.

737.1 parts of the copolymer solution A described above, 216.5 parts of 1,3-diaminopropane and 0.337 part of lithium octoate were weighed into a stainless steel kettle with a stirrer, steam-heated column and condensate separator and heated up to 140° C. The temperature is then increased slowly to 160° C., it being ensured that the column head temperature does not exceed 90° C. The reaction mixture is now kept at this temperature for 12 hours. The excess diamine is then distilled off in vacuo, several portions of 200 parts of diacetone alcohol being added and then being distilled off together with the diamine. The solid is then dissolved with 74.2 parts of Shellsol A ® and 412.1 parts of n-butanol.

The copolymer solution 1 thus obtained has a solids content of 62.7% (1 hour, 130° C.), a viscosity (50% strength in butanol) of 8.7 dPas (23° C.) and an amine equivalent weight of 452.4 (based on 62.7% of solids). After storage at room temperature for 9 months, the viscosity of copolymer solution 1 was measured again: after dilution with butanol to a solids content of 50%, it was 10.4 dPas (23° C.).

30 parts of this copolymer solution 1 are mixed with 20 parts of an aliphatic epoxy resin having a molecular weight of about 1,200 and an epoxide equivalent weight of about 300 and the mixture is diluted with 7.5 parts of butyl acetate. The basis of the epoxy resin employed is a dinuclear melamine resin, reacted with acrylamide and with subsequent epoxidation of the acrylic double bonds (tradename LSE 4103 from Monsanto). The clear lacquer 1 thus obtained is knife-coated onto glass plates with a wet film thickness of 200 μm and then dried under the conditions stated in Table 1. The resulting coatings were then tested by the methods listed in Table 1, giving the results likewise stated in Table 1.

To prepare a clear lacquer 2, 30 parts of the copolymer solution 1 described above are mixed with 15.2 parts of a commercially available epxodized novolak (commercial product D.E.N. 444 from Dow Chemical) with an epoxide equivalent weight of 228, a viscosity of >40 dPas and an average functionality of 3 to 4 and the mixture is diluted with 7.5 parts of butyl acetate. This clear lacquer 2 is knife-coated onto glass slabs analogously to clear lacquer 1 and stoved and the resulting coating is analyzed analogously to clear lacquer 1. The test results are shown in Table 1.

TABLE 1

| Test results | Lacquer 1 | Lacquer 2 |
|---|---|---|
| Film thickness (dry) (μm) | 60 | 60 |
| König pendulum hardness, after drying at 100° C. for 30 minutes and subsequent cooling at room temperature for 4 hours (seconds) | 100.8 | 189 |
| König pendulum hardness after drying at room temperature for 7 days (seconds) | 142.8 | 72.8 |
| Petrol test$^a$ after drying at 100° C. for 30 minutes and subsequent cooling at room temperature for 4 hours | 0/0 | 0/0 |
| Petrol test$^a$ after drying at room temperature for 7 days | 0/0 | 0/0 |

$^a$Felt platelets (φ 5 cm) impregnated with commercially available high-octane petrol are left covered on the film for 5 minutes. The marking (0 = no marking; 3 = distinct marking) and the softening of the film (0 = no softening; 3 = distinct softening) are then evaluated.

COMPARISON EXAMPLE

A copolymer containing amino groups was prepared by aminolysis of a copolymer containing alkyl ester groups, for the preparation of which no vinyl ester monomers were used, in accordance with the doctrine of Example 6 of U.S. Pat. No. 4,120,839.

The following components are weighed into the monomer tank I and mixed:
1,100 parts of methyl methacrylate,
400 parts of butyl methacrylate and
20 parts of mercaptoethanol.

The following components are weighed into monomer tank II and mixed:
500 parts of styrene and
80 parts of a commercially available 75% strength solution of t-butyl peracetate in isododecane.

8 parts of a commercially available solution of t-butyl peracetate in isodecane are weighed into the initiator tank.

500 parts of butylglycol are initially introduced into a reaction kettle provided with a stirrer, reflux condenser, thermometer and feed equipment and heated up to 150° C. The contents of monomer tank I and monomer tank II are then metered in at a constant amount of addition in the course of 9.25 hours. The temperature is then kept at 150° C. for a further 15 minutes, before the mixture from the initiator tank is added in the course of 15 minutes. After this addition, after-polymerization is carried out for a further hour.

The copolymer solution A' thus obtained has a solids content of 79.6% (1 hour, 130° C.) and a viscosity (50% strength in butyl acetate) of 1.25 dPas (23° C.).

968.8 parts of copolymer solution A' and 206.8 parts of xylene are weighed into a stainless steel kettle with a stirrer, steam-heated column and condensate separator and are heated up to 70° C. 159.6 parts of diethylenetriamine (amine equivalent weight 33.6) are added and heating is continued up to a maximum of 145° C. The solids content and the amine equivalent weight of the solution are regularly determined at intervals of 90 minutes. The temperature was kept at 145° C. until the copolymer solution had a solids content of 74.3% (15 minutes, 180° C.) and an amine equivalent weight of 398.2. Thereafter, the solid was dissolved with 42.9 parts of xylene. The mixture was diluted to a theoretical solids content of 65% with butylglycol. The resulting copolymer solution A' had a solids content of 68% (15 minutes, 180° C.) and a viscosity of >40 dPas (50% strength in butanol) and 16–17 dPas (35% strength in butanol).

After storage at room temperature for 3 months, on dissolving solution A, was no longer soluble in butanol.

A comparison of the copolymer solution A obtained in Example 1 with the copolymer solution A' obtained in the comparison example shows that the solution of the copolymer A according to the invention has a considerably lower viscosity, at 8.7 dPas (23° C., 50% strength in butanol) than the solution of the copolymer A', at 16-17 dPas (23° C., 35% strength in butanol), prepared in accordance with U.S. Pat. No. 4,120,839.

It is thus possible to prepare coating systems with a high solids content and therefore low pollution of the environment by solvents when the films dry by using copolymers according to the invention as binders.

The coating agents prepared using copolymer solution A according to Example 1 furthermore lead (compare Table 1) to coatings of good hardness and resistance to petrol. Depending on the hardener component employed (compare lacquer 1 and lacquer 2 in Table 1), these coating agents are also very suitable for automobile repair lacquering (low stoving temperatures).

I claim:

1. A copolymer (B), containing amino groups, obtained by reacting a first copolymer (A) with polyamines, wherein copolymer (A) contains alkyl ester groups, and is synthesized from
   a1) 5 to 25% by wight of one or more vinyl esters of monocarboxylic acids,
   a2) 10 to 50% by weight of one or more vinylaromatic hydrocarbons,
   a3) 10 to 40% by weight of one or more alkyl esters of aliphatic, olefinically unsaturated carboxylic acids having 1 to 6 C atoms, in the alkyl radical and
   a4) 0 to 40% by wight of other ethylenically unsaturated copolymerizable monomers, the sum of components (a1) to (a4) in each case being 100% by weight, and wherein the copolymer (A) is prepared by the process of free radical solution polymerization at temperatures of 130° to 200° C., wherein the free radical polymerization process includes the steps of
i) initially introducing at least between 60% by weight, of the total amount of components a1,
ii) metering in components a2 to a4 and any remainder of component a1 within a monomer addition period which is of equal length for all the components such that
   1) the amount of component a1 added per unit time remains constant or decreases within the monomer addition period,
   2) the amount of components a3 and a4 added power unit time remains constant within the monomer addition period and
   3) the amount of component a2 added within the first third of the monomer addition period is 15 to 30% by weight, and within the second third is 25 to 40% by weight, and within the last third is 35 to 60% by weight of ht total amount of component a2, and wherein the resultant copolymer (B) containing amino groups has an amine number of 30 to 150 mg of KOH/g and an average molecular weight of 1,500 to 8,000.

2. The copolymer (B) of claim 1, wherein copolymer (A) containing alkyl ester groups is synthesized from
   a1) 10 to 20% by weight of one or more vinyl esters of monocarboxylic acids, selected form the group consisting of vinyl esters of monocarboxylic acids having 5 to 15 C atoms per molecule and branched in the α position,
   a2) 20 to 45% by weight of one or more vinylaromatic hydrocarbons,
   a3) 15 to 35% by weight of one or more alkyl esters of aliphatic, olefinically unsaturated carboxylic acids having 1 to 4 C atoms, in the alkyl radical and
   a4) 0 to 40 % by weight of other ethylenically unsaturated copolymerizable monomers, the sum of components (a1) to (a4) in each case being 100% by weight, and wherein copolymer (A) is prepared by free radical solution polymerization at temperatures of 150° to 180° C., wherein the free radical polymerization process includes the steps of
i) initially introducing 100% by wight, of the total amount of component a1,
ii) metering in components a2 to a4 and within a monomer addition period which is of equal length for all the components such that
   1) the amount of components a3 and a4 added per unit time remains constant within the monomer addition period, and
   2) the amount of component a2 added within the first third of the monomer addition period is 18 to 265 by wight, and within the second third is 30 to 38% by weight, and within the last third is 40 to 50% by weight of the total amount of component a2.

3. A copolymer (B) containing amino groups as claimed in claim 1, wherein the copolymer (B) has an amine number of 30 to 120 mg of KOH/g.

4. A copolymer (B) containing amino groups as claimed in claim 1, wherein one or more vinyl esters of saturated aliphatic monocarboxylic acids having 9 to 11 C atoms and branched on the α-C atom are employed as component (a1).

* * * * *